(12) United States Patent
Huettner et al.

(10) Patent No.: US 9,108,806 B2
(45) Date of Patent: Aug. 18, 2015

(54) STORAGE DEVICE FOR A FILLING LINE AND BEVERAGE FILLING LINE COMPRISING SUCH A STORAGE DEVICE

(75) Inventors: Johann Huettner, Mallersdorf-Pfaffenberg (DE); Martin Seger, Neumarkt in der Oberpfalz (DE); Toni Hifinger, Regensburg (DE); Kyoung-Won Lee, Regensburg (DE)

(73) Assignee: KRONES AG, Neutraubling (DE)

( * ) Notice: Subject to any disclaimer, the term of this patent is extended or adjusted under 35 U.S.C. 154(b) by 87 days.

(21) Appl. No.: 13/565,879

(22) Filed: Aug. 3, 2012

(65) Prior Publication Data
US 2013/0032448 A1   Feb. 7, 2013

(30) Foreign Application Priority Data
Aug. 4, 2011   (DE) .......................... 10 2011 080 441

(51) Int. Cl.
| | | |
|---|---|---|
| *B65G 47/69* | (2006.01) | |
| *B65G 47/32* | (2006.01) | |
| *B65G 47/61* | (2006.01) | |
| *B65G 47/51* | (2006.01) | |

(52) U.S. Cl.
CPC .................................. *B65G 47/5104* (2013.01)

(58) Field of Classification Search
None
See application file for complete search history.

(56) References Cited

U.S. PATENT DOCUMENTS

| | | | | |
|---|---|---|---|---|
| 5,304,027 | A | * | 4/1994 | La Barre et al. ............ 198/347.2 |
| 6,742,648 | B2 | * | 6/2004 | Honegger .................. 198/687.1 |
| 8,556,620 | B2 | * | 10/2013 | Parrinello et al. ............. 425/524 |
| 2009/0050445 | A1 | | 2/2009 | Balk |
| 2012/0024660 | A1 | * | 2/2012 | Seger et al. ................ 198/347.1 |

FOREIGN PATENT DOCUMENTS

| | | |
|---|---|---|
| CN | 101374739 A | 2/2009 |
| DE | 41 33 114 A1 | 4/1993 |
| DE | 199 10 683 A1 | 9/2000 |
| DE | 102008035004 A1 | 1/2010 |
| EP | 1645340 A1 | 4/2006 |
| WO | WO 2007123401 A1 | 11/2007 |
| WO | WO 2010009796 A2 | 1/2010 |
| WO | WO 2011131704 A1 | 10/2011 |

OTHER PUBLICATIONS

European Patent Office, Extended European Search Report in European Patent Application No. 12 17 1478 (Oct. 22, 2012).

* cited by examiner

*Primary Examiner* — Kavel Singh
(74) *Attorney, Agent, or Firm* — Leydig, Voit & Mayer, Ltd.

(57) ABSTRACT

A storage device for a filling line for intermediately storing runners that are configured to accommodate containers includes a buffer stream configured to receive the runners with a variable intermediate storage capacity of the runners. An introduction device is configured to introduce the runners, independently of each other, from a storage area into the buffer stream.

10 Claims, 3 Drawing Sheets

STORAGE DEVICE FOR A FILLING LINE AND BEVERAGE FILLING LINE COMPRISING SUCH A STORAGE DEVICE

CROSS-REFERENCE TO PRIOR APPLICATION

Priority is claimed to German Patent Application No. DE 10 2011 080 441.2, filed on Aug. 4, 2011, the entire disclosure of which is hereby incorporated by reference herein.

FIELD

The invention relates to a storage device for a filling line for intermediately storing runners designed to accommodate containers, wherein the runners can be introduced into a buffer stream the intermediate storage capacity of which is variable, and an introduction device is present via which the runners can be introduced from a storage region into the buffer stream.

BACKGROUND

From prior art, storage devices are known, for example from DE 41 33 114 which discloses a conveyor system for unit loads. DE 41 33 114 A1 discloses a conveyor system for unit loads, such as bottles, containers or the like, with an asynchronous linear motor as a drive. To ensure a particularly simple design of the runners used therein, a long stator motor with stationary electric/electronic components and runners without brushes, the motor forming the conveyor line, are disclosed for transporting the unit loads. In this conveyor system, too, unit loads are transferred to the runners and then processed in processing stations.

From DE 10 2008 035 004 A1 and WO 2010/009796 A2, respectively, methods of handling containers during the transport through filling lines are also known. In these two citations, a method of handling containers, in particular bottles of plastics, such as PP or PET, or of handling pouch packs with closing elements, during their transport through a filling line or the like is known, comprising at least one treatment device, such as a filler, a closer, an inspection device, a labeling machine or the like. The containers between the treatment devices of DE 10 2008 035 004 A1 are transferred in transfer areas directly or by means of transport devices, such as transport starwheels, conveying belts, or the like.

SUMMARY

In an embodiment, the present invention provides a storage device for a filling line for intermediately storing runners that are configured to accommodate containers. A buffer stream is configured to receive the runners and has a variable intermediate storage capacity of the runners. An introduction device is configured to introduce the runners, independently of each other, from a storage area into the buffer stream.

BRIEF DESCRIPTION OF THE DRAWINGS

The present invention will be described in even greater detail below based on the exemplary figures, which are schematic. The invention is not limited to the exemplary embodiments. All features described and/or illustrated herein can be used alone or combined in different combinations in embodiments of the invention. Like features in the figures are designated by same reference numerals. The features and advantages of various embodiments of the present invention will become apparent by reading the following detailed description with reference to the attached drawings which illustrate the following.

DETAILED DESCRIPTION

Figure 1:
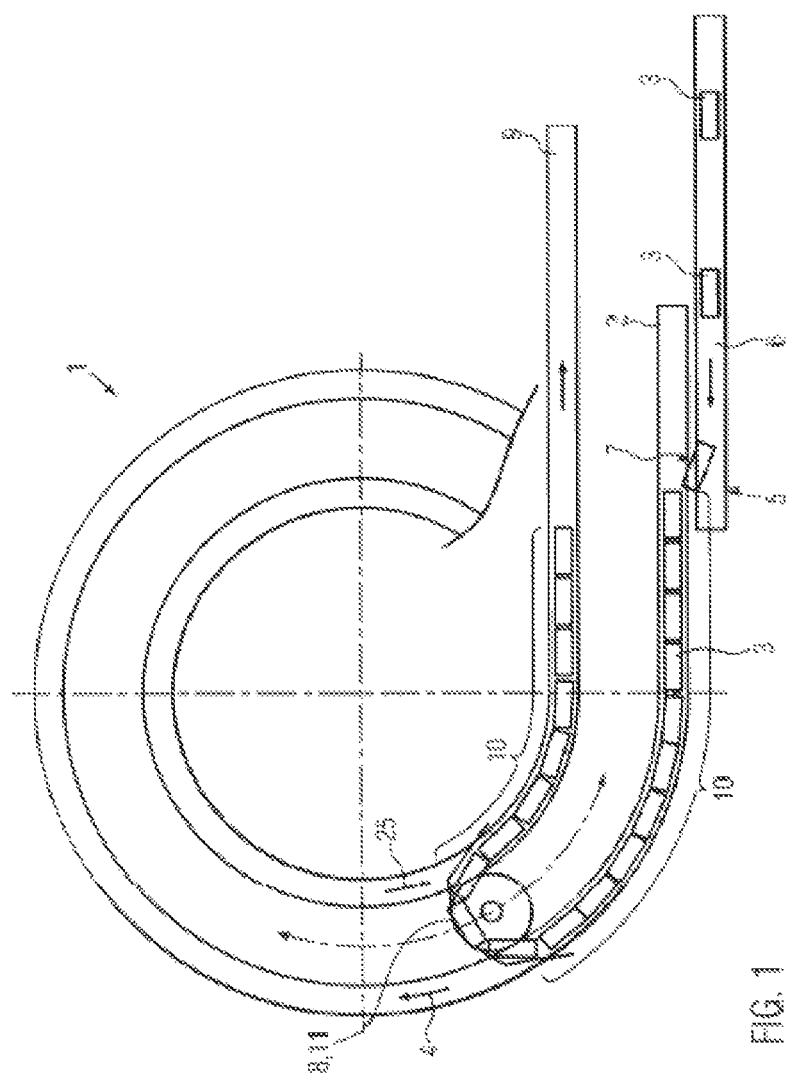
FIG. 1 shows a plan view of a first storage device according to the invention.

In an embodiment, the present invention provides a design in which the intermediate storage capacity of the buffer stream is flexible. The design is simple and inexpensive and provides a solution that is particularly fail-proof and energy efficient.

According to an embodiment of the invention, the runners can be introduced into the buffer stream independently of each other. The runners are then designed as direct supports of the packs used in a filling line.

The runners can also be referred to as "shuttle" and are transport vehicles by means of which for example filled packs further processed in the filling line can be transported.

For example, it is advantageous to have a control device to control the speed of each individual runner independently of the speed of the other runners. It is also possible for the runners to all have the same speed. However, for example, an individual open- or closed-loop speed control device offers a higher degree of flexibility. While the runners already located further in the buffer stream move more slowly, further upstream, for example adjacent to the introduction device, several runners can be sent behind at an increased speed to quickly increase the intermediate storage capacity. As soon as the runners located upstream have reached the runners located downstream, speed can be set to be the same again for all runners.

It is furthermore advantageous to have a first magnetic force application device to introduce the runners into the buffer stream and/or move them inside it by the action of magnetic force. This permits to now move many small transport units, for example utilizing a synchronous motor operation.

An advantageous embodiment provides that at least one of the runners is designed to accommodate and transport a container, such as a bottle of glass or PET. Such a storage device can then be easily integrated into conventional filling lines.

It is furthermore advantageous for the intermediate storage capacity to be determined by the speed of the runners in the buffer stream. The temporary buffer capacity can then be varied. As an alternative, the runners can run down a slope by their own gravity and are smoothly slowed down to a certain speed just in front of a lower group end and joined to the end. The slope section can have an annular design.

As an alternative or in addition, it is possible to provide a deflection device for determining the length of the buffer stream to have an influence on the intermediate storage capacity. The longer the buffer stream is, that means the more the deflection device is remote from an introduction device, the more runners can be stored intermediately.

To do this in a particularly simple manner, it is advantageous for the deflection device to be designed as a slide whose distance from the introduction device can be varied.

If the slide is designed to cause a deflection of the runners from a first buffer stream direction to a second buffer stream direction opposed to the first one, now only relatively little space is required for such a storage device. Then, a compact storage device construction is achieved.

It is advantageous to have a second magnetic force application device which is designed to change the position of the slide by means of magnetic force.

It is moreover advantageous for the runners to be mounted to slide on rails, as then only particularly little operating power is required, while good guidance is provided.

If the buffer stream extends essentially horizontally or in a vertically disposed plane, better accessibility can be achieved.

It is furthermore advantageous for the buffer stream to comprise distributing points where runners can be introduced into the buffer stream and/or removed from it, wherein the introduction device comprises such a distributing point. Such branches permit to introduce or discharge stand-by runners or runners with other fastening devices for the containers. In particular, bypass streams can be generated in this manner leading to an essential extension or shortening of the buffer stream. When such a distributing point is actuated, intermediate storage capacity can then be varied, sometimes with a great effect. The variability of the storage device is increased. Energy consumption is reduced, and only little floor space is required. Moreover, the downtimes of the machine are reduced in case of a defect as defective runners can be taken from the rail or the rails to replace them by intact runners. The defective runners can then be repaired or serviced outside the production process. Moreover, the blocked point can be passed by via the branch.

An embodiment of the invention also relates to a beverage filling line with a storage device according to an embodiment of the invention.

In FIG. 1, a first embodiment of a first storage device according to the invention is represented in a plan view. The storage device has reference numeral 1.

Such a storage device 1 is used in a filling line, where packs, such as bottles, bags or cans, are processed in said filling line. In such filling lines, for example bottles are filled, in particular bottles of glass or PET.

Such filling lines often furthermore comprise fillers, inspection devices, heaters and labeling machines.

The storage device 1 comprises a first rail 2 on which runners 3 are transported into a first direction 4. The runners 3 are brought from a storage area 6 onto the first rail 2 at an introduction device 5. To this end, the introduction device 5 comprises a distributing point 7.

At the distributing point 7, a runner 3 up to then located in the storage area 6 then enters into the buffer stream 10 that extends along the rail 2 from the distributing point 7 to a deflection point 8, and then from the defection point 8 further along a second rail 9. A deflection device 11 is provided at the deflection point 8 and, in an embodiment, is designed as a slide 12 and is mounted to be movable on the two rails 2 and 9.

The runners 3 are used as direct supports for the containers. They are designed to accommodate and transport a container, such as a glass or PET bottle. The runners 3 are sent into the buffer stream 10 as required. All runners 3 that are not required are located in a zone of the storage area 6 also referred to as starter station. The speed control of the runners 3, and finally also of the buffer stream 10, determines the buffer capacity, that means the intermediate storage capacity of the storage device 1.

Figure 2:
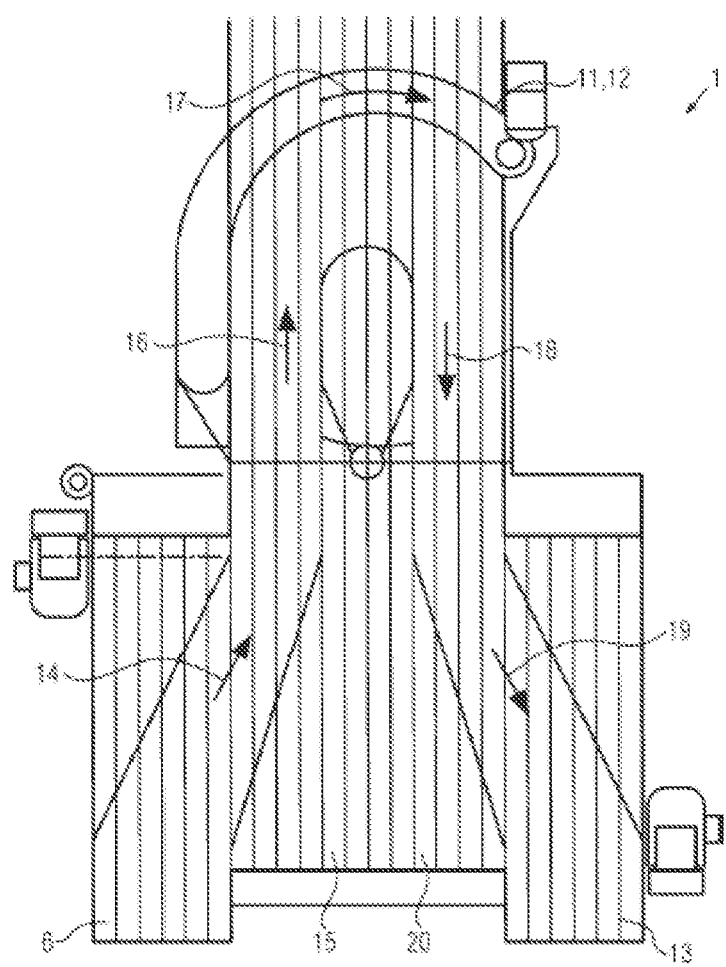
FIG. 2 shows a plan view of a second storage device according to the invention.

FIG. 2 represents a second embodiment of a storage device 1 according to the invention. The runners 3, packs, containers, or unit loads in general are not represented here but are supplied on a primary conveyor belt comprising the storage area 6 and removed from the discharge area 13 on a secondary conveyor belt when they are no longer required. The runners 3, packs, containers, or unit loads can be transferred from the discharge area 13 to the storage area 6 via a separate circuit. The runners 3, packs, containers, or unit loads are then conveyed onto a first conveying belt 15 according to the direction of motion 14, then transferred to the deflection device 11 in the direction of motion 16 to take up the direction of motion 17 there, and then move into the direction of motion 18 opposed to the direction of motion 14. At another distributing point, the runners 3, packs, containers or unit loads are optionally deflected into the direction of motion 19.

In such an embodiment, the positioning of the deflection device 11 designed as a slide 12 is achieved by the introduction of magnetic force. The slide 12 itself becomes a runner-like component in the process.

By this, drag chains and/or sprocket belts can be eliminated and a more exposed construction without superstructures can be achieved.

At the second distributing point, the runners 3, packs, containers or unit loads are discharged from the second belt 20 in the direction of motion 19.

Figure 3:
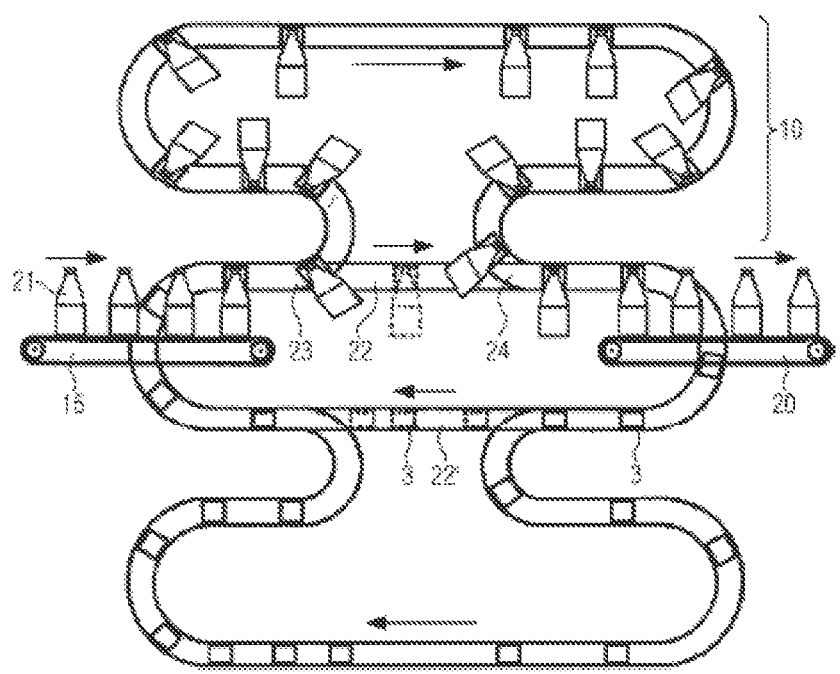
FIG. 3 shows a third storage device according to the invention.

The third embodiment represented in FIG. 3 shows how bottle-like containers 21 are supplied via a first belt, taken up by one runner 3 each, and then incorporated into a buffer stream 10. In the region of a second belt 22, the containers 21 are then released again from the buffer stream 10 and transported and processed further. A bypass section 23 is shown which, when activated, permits a shortening of the buffer stream 10 between two distributing points 23 and 24. In this manner, containers 21 can also be brought to a new place in the buffer stream 10. Such a bypass section 22' is also realized on the "empty side" of the buffer circuit.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

What is claimed is:

1. A storage device for a filling line for intermediately storing runners that are configured to accommodate containers, the storage device comprising:
    a buffer stream configured to receive the runners with a variable intermediate storage capacity of the runners during operation of the filling line,
    an introduction device configured to introduce the runners, independently of each other, from a storage area into the buffer stream during the operation of the filling line, and
    a deflection device disposed such that a length of the buffer stream is determinable, wherein the deflection device includes a slide disposed with a variable distance to the introduction device, and wherein the slide is configured to deflect the runners from a first buffer stream direction into a second buffer stream direction opposed to the first buffer stream direction.

2. The storage device according to claim 1, further comprising a control device configured to control a speed of each of the runners individually and independently from each other.

3. The storage device according to claim 1, further comprising a first magnetic force application device configured to at least one of introduce the runners into the buffer stream and move the runners in the buffer stream.

4. The storage device according to claim 1, wherein at least one of the runners is configured to transport at least one of a glass container and a polyethylene terephthalate (PET) bottle.

5. The storage device according claim 1, wherein the buffer stream is configured to vary the intermediate storage capacity based on a speed of the runners in the buffer stream.

6. The storage device according to claim 1, wherein the buffer stream extends essentially horizontally.

7. The storage device according to claim 1, wherein the buffer stream extends in a vertically disposed plane.

8. A beverage filling line comprising:
- a storage device for intermediately storing runners that are configured to accommodate containers in the filling line, the storage device comprising:
  - a buffer stream configured to receive the runners with a variable intermediate storage capacity of the runners during operation of the filling line,
  - an introduction device configured to introduce the runners, independently of each other, from a storage area into the buffer stream during the operation of the filling line, and
  - a deflection device disposed such that a length of the buffer stream is determinable, wherein the deflection device includes a slide disposed with a variable distance to the introduction device, and wherein the slide is configured to deflect the runners from a first buffer stream direction into a second buffer stream direction opposed to the first buffer stream direction.

9. The storage device according to claim 1, wherein each of the runners is configured to carry no more than one of the containers apiece.

10. The beverage filling line according to claim 8, wherein each of the runners is configured to carry no more than one of the containers apiece.

* * * * *